United States Patent [19]

Moderlak et al.

[11] 4,437,827

[45] Mar. 20, 1984

[54] SPINNING MANIFOLD WITH SERIAL NOZZLE BLOCKS

[75] Inventors: Helmut Moderlak, Maintal; Günter Koschinek, Dietzenbach; Rolf Zinsser, Heusenstamm; Richard Prehler, Frankfurt am Main; Bernd Kretschmann, Kahl, all of Fed. Rep. of Germany

[73] Assignee: Davy McKee Aktiengesellschaft, Fed. Rep. of Germany

[21] Appl. No.: 363,249

[22] Filed: Mar. 29, 1982

[30] Foreign Application Priority Data

Apr. 3, 1981 [DE] Fed. Rep. of Germany ....... 3113495

[51] Int. Cl.³ ............................................... D01D 1/06
[52] U.S. Cl. ............................ 425/378 S; 425/379 S
[58] Field of Search ............ 425/192 S, 379 S, 378 S; 264/176 F

[56] References Cited

U.S. PATENT DOCUMENTS

| | | | |
|---|---|---|---|
| 2,841,821 | 7/1958 | Phepps | 425/192 S |
| 3,562,858 | 2/1971 | Lehner | 425/192 S |
| 3,655,314 | 4/1972 | Lenke et al. | 425/192 S |
| 3,948,592 | 4/1976 | Schad et al. | 425/192 S |
| 4,035,127 | 7/1977 | Ogasawara et al. | 425/192 S |
| 4,099,898 | 7/1978 | Beck | 425/192 S |
| 4,225,299 | 9/1980 | Roberts | 264/176 F |

FOREIGN PATENT DOCUMENTS

| | | | |
|---|---|---|---|
| 44-2496 | 2/1969 | Japan | 425/197 S |
| 47-42043 | 10/1972 | Japan | 264/176 F |
| 53-2618 | 1/1978 | Japan | 425/197 S |
| 690087 | 10/1979 | U.S.S.R. | 284/178 F |

*Primary Examiner*—Jay H. Woo
*Attorney, Agent, or Firm*—Allegretti, Newitt, Witcoff & McAndrews, Ltd.

[57] ABSTRACT

A spinning manifold for melt-spinning synthetic high polymers is disclosed. The manifold has an elongated hollow body with cavities for the conduction of a heating medium, such as diphenyl, and a vertical nozzle shaft having heatable members placed between serially arranged and dismountable nozzle blocks such that the side walls of the heatable members are in heat exchange with adjacent nozzle blocks. These heatable members are displaceably mounted within the nozzle shaft. The pump shaft of the spinning manifold may also have additional heatable members placed between the pumping units. The same heating medium that flows through the cavities of the spinning manifold is placed within the heatable members.

7 Claims, 6 Drawing Figures

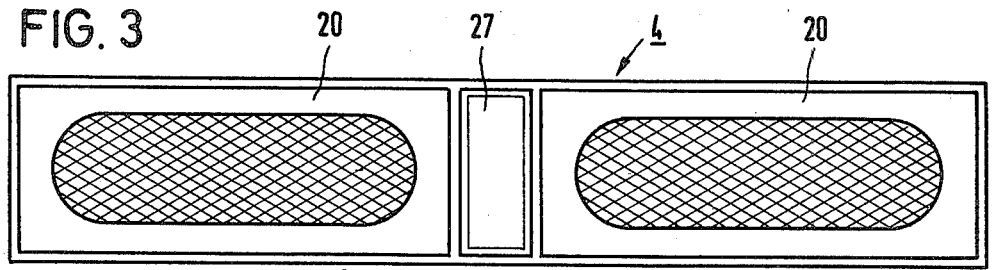
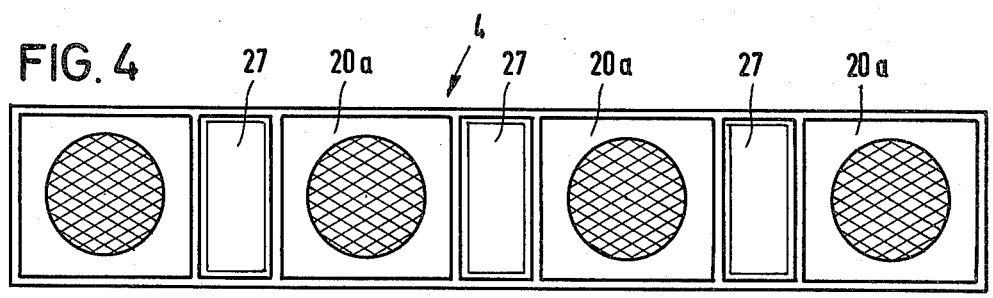
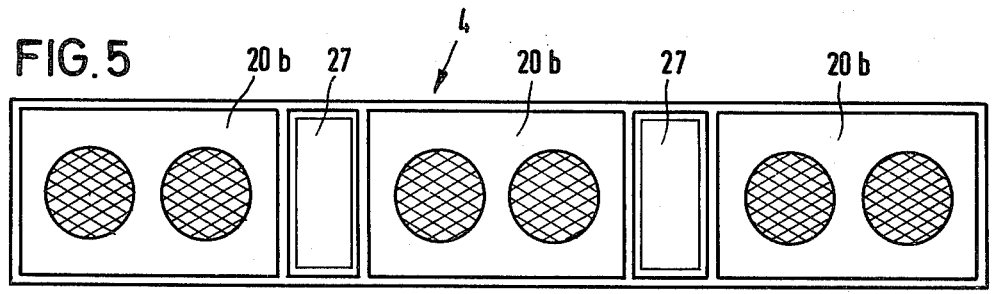
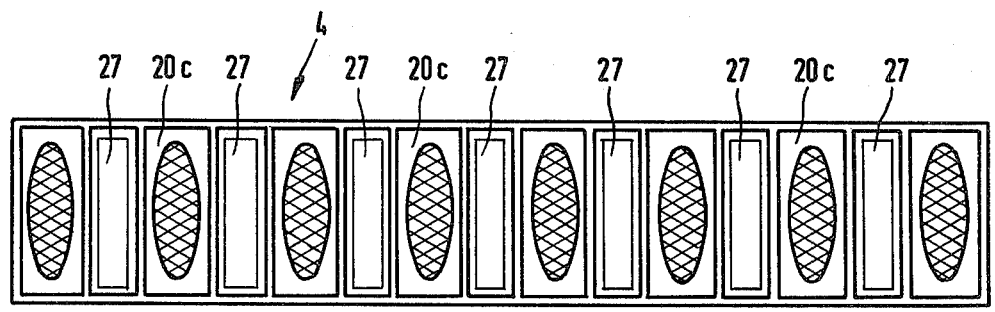

SPINNING MANIFOLD WITH SERIAL NOZZLE BLOCKS

BACKGROUND OF THE INVENTION

1. Field of the Invention

The present invention relates to spinning manifolds used in melt-spinning installations for synthetic high molecular weight polymers. Such manifolds have an elongated hollow member containing cavities for the conduction of a heating medium and at least one vertical nozzle shaft with heatable walls. In addition, a plurality of separately dismountable nozzle blocks having rectangular cross-sections are serially arranged within the nozzle shaft.

2. Background of the Invention

In the spinning manifolds known in the prior art, the nozzle blocks are part of a spinning block or unit. The spinning block comprises a spinning pump, driving shaft, pump block or unit, nozzle block and insulating or filler elements. The nozzle block comprises a nozzle block housing having a filter, a supporting plate and a nozzle plate in which separate capillaries for the spinning of high polymer filaments are arranged. The nozzle blocks may be fitted into the nozzle shaft from below or from above. The basic construction of such a spinning block is adequately described in West German Patent Application No. 23 31 764.

A prerequisite to the production of quality filaments is that the processing parameters for the areas surrounding each separate filament must be as identical as possible. Temperature is especially crucial. Thus, the temperature of the spinning melt and all parts of the spinning block with which the melt comes into contact should be at the same temperature.

Spinning systems which have a plurality of nozzle blocks per nozzle shaft permit the production of several cables of polymer filaments in one spinning operation. Thus spinning systems with a plurality of nozzle blocks present a favorable balance between the requirements of capacity and space. However, the conventional serial arrangement of nozzle blocks places one nozzle block immediately adjacent to another. The consequence of this arrangement is that the nozzle blocks on the ends of a serial arrangement are in heat exchange with three sides of the heated nozzle shaft wall, while the interior nozzle blocks only exchange heat with two sides of the heated nozzle shaft wall.

The heating in spinning manifolds is predominately by heat radiation or exchange. Because the heat flow characteristics of the heating medium differ for the interior nozzle blocks and the exterior nozzle blocks, the temperature of the central nozzle blocks may be as much as 20 degrees centrigrade lower than the temperature of the end nozzle blocks. Thus, the conventional serial arrangement of nozzle blocks in spinning manifolds necessarily means that the processing parameters will vary from one nozzle block to another and that the resulting spun filaments will not be of the highest possible quality.

SUMMARY OF THE INVENTION

It is an object of the present invention to provide a spinning manifold with serially arranged nozzle blocks such that a constant temperature can be maintained throughout the nozzle blocks.

It is a further object of the present invention to provide a spinning manifold which can utilize different numbers and arrangements of nozzle blocks, while maintaining a uniform temperature within the nozzle blocks.

It is a specific object of the present invention to provide a spinning manifold for high polymer filaments having heatable members between juxtaposed nozzle blocks such that the heatable members extend the entire width of the nozzle shaft. Thus, the side walls of the heatable members exchange heat with adjacent nozzle blocks by way of heat radiation. It is understood that the heatable members are to be heated to the temperature required for operation of the spinning manifold.

By introducing heatable members between juxtaposed nozzle blocks, the present invention insures that each nozzle block will receive heat on each of its four vertical sides. In this way, appropriate temperature control of the heating medium will maintain the same temperature at all nozzle blocks such that all filaments spun from one spinning manifold will be substantially identical.

According to a further feature of the present invention, it is particularly advantageous to displaceably mount the heatable members within the nozzle shaft. This permits the spinning manifold to be equipped with nozzle blocks of various types and arrangements.

It is possible to provide the heatable members with electric heating resistors. However, since a conducting liquid, such as diphenyl, is usually used for the heating of the hollow body or member of the spinning manifold itself, it is most desirable to use the same type of liquid within the heatable members.

The heatable members preferably form substantially parallelipipedic chambers that may be introduced into the nozzle shaft. The chamber walls of the heatable members that are adjacent to the nozzle blocks serve as heat exchangers within the nozzle blocks, preferably by heat radiation.

With respect to a spinning manifold having plurality of pumping units and spinning pumps for each nozzle shaft, the present invention further provides additional heating chambers for the heating medium between juxtaposed pumping units. Thus, the side walls of these additional heating chambers are in a heat exchanging relationship with adjoining pumping units. This is desirable because the high viscosity and pressure and the internal friction associated with a spinning melt produce heat at the pumping units. This heat may be transmitted to the nozzle blocks and might result in a non-uniform temperature distribution within the nozzle blocks. By placing additional heatable members in the additional heating chambers between the pumping units, any excess heat will be transferred to the heating medium by maintaining the additional heatable members at a constant operating temperature.

Further objects of the present invention will become apparent from the following description of the preferred embodiment and claims.

BRIEF DESCRIPTION OF THE DRAWINGS

FIGS. 3 through 6 are views from below of nozzle shafts having various numbers, sizes, and arrangements of nozzle blocks.

DESCRIPTION OF THE PREFERRED EMBODIMENT

Figure 1:
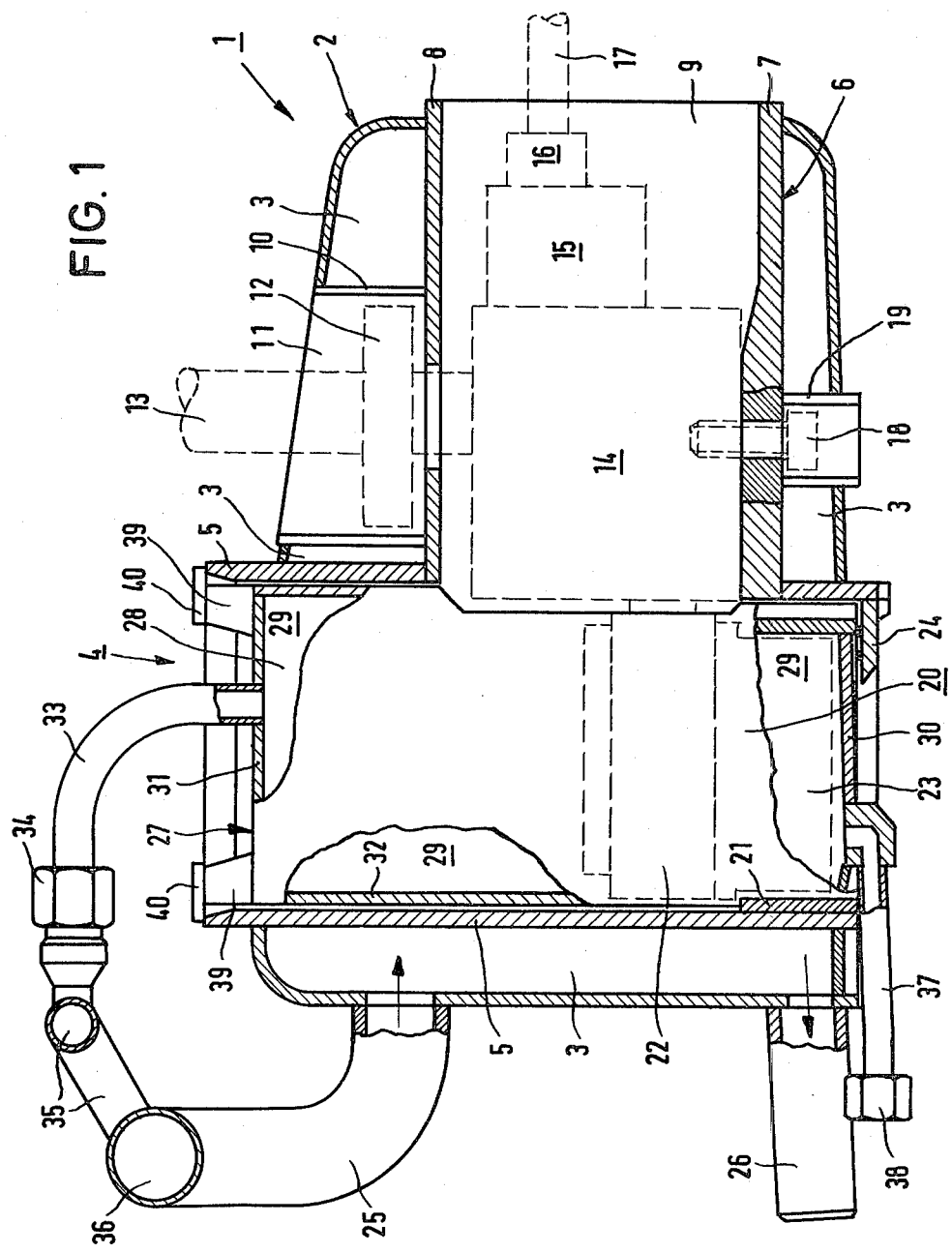
FIG. 1 is a cross-sectional view of a spinning manifold, taken through different sectional planes.

The spinning manifold 1 according to FIG. 1 comprises an elongated hollow member 2 having cavities 3. These cavities all communicate with each other and serve for the conduction of a heating medium. The hollow member 2 has at least one nozzle shaft 4 within it. This nozzle shaft has vertical shaft walls 5 that define a substantially parallelipipedic chamber being substantially open in the upwards direction. Only the vertical shaft walls 5 that are perpindicular to the plane of drawing are shown. The shaft wall 5 on the right of FIG. 1 is provided with a rectangular recess extending over its entire length that is perpendicular to the plane of the drawing. A horizontal pumping shaft 6, which comprises a shaft base 7, a shaft top or roof 8 and two side walls 9, of which only the rear side wall is visible, is fitted into this rectangular recess. Situated above the shaft roof 8 is a supply chamber 11. The supply chamber comprises a short pipe or union 10 in which is situated a flange 12.

A heated product supply pipe 13 is connected by the flange 12 to a pumping unit 14. This pumping unit is provided with internal ducts and is laterally fitted a spinning pump 15. This spinning pump is capable of being driven by way of a clutch 16 and a pump shaft 17. The pumping unit 14 and the spinning pump 15 are both placed within the pump shaft 6. The pumping unit 14 is held in place by a pumping unit threaded connection 18, which extends through the base 7 of the pump shaft and is sealed off relative to the cavity 3 by a pipe union 19.

A nozzle block 20 is inserted from above into the nozzle shaft 4 and is supported on a seating 21 that is welded to the shaft wall 5. The nozzle block 20 has a nozzle block housing that comprises a top part 22 and a bottom part 23. A filter (not shown) is located in the top part 22. Within the bottom part 23 is arranged a nozzle plate having capillaries. A supporting plate with relatively large bores is placed above the capillaries. The nozzle block 20 and the pumping unit 14 are sealably connected to one another by a threaded feed rod (not shown) such that the ducts for the product are connected to both the pumping unit 14 and the nozzle block 20. The remaining part of the nozzle shaft 4 above the nozzle block 20 is filled with a filling element made of metal and an insulating filler. The nozzle shaft 4 is then sealed off in the downward direction in part by a protective plate 24 to prevent heat radiation in the downward direction. A heating medium is maintained in the hollow member 2 by means of a steam supply pipe 25 and a condensate discharge pipe 26.

Arranged between the separate nozzle blocks 20 are heatable members 27 that occupy the breadth of the nozzle shaft in the plane of the drawing. These heatable members 27 have side walls 28 that extend as far as the nozzle blocks 20 and are in heat exchange with them.

The heatable members 27 are parallelipipedic chambers 29 having a chamber base 30, a chamber cover 31, two end walls of 32 and two side walls 28. Arranged within the chamber cover 31 is a steam supply pipe 33 that is connected by way of a quick release threaded pipe coupling 34 and other connecting pipes 35 to a distributor pipe 36. This distributor pipe also communicates with the steam supply pipe 25. A condensate discharge pipe 27 is found within the chamber base 30. This discharge pipe is joined with the condensate discharge pipe 26 by means of quick release threaded pipe coupling 38. Thus, a heating medium circuit is maintained within the chamber 29. The quick release threaded pipe couplings 34 and 38 guarantee that the chamber 29 can be removed quickly from the nozzle shaft 4 and rearranged into other configurations. In order to further facilitate the replacement of the chamber 29, this chamber is inserted loosely from above into the nozzle shaft 4 and is supported by means of flanges 39 and supporting lugs 40 on the upper rims of the nozzle shaft 4.

Figure 2:
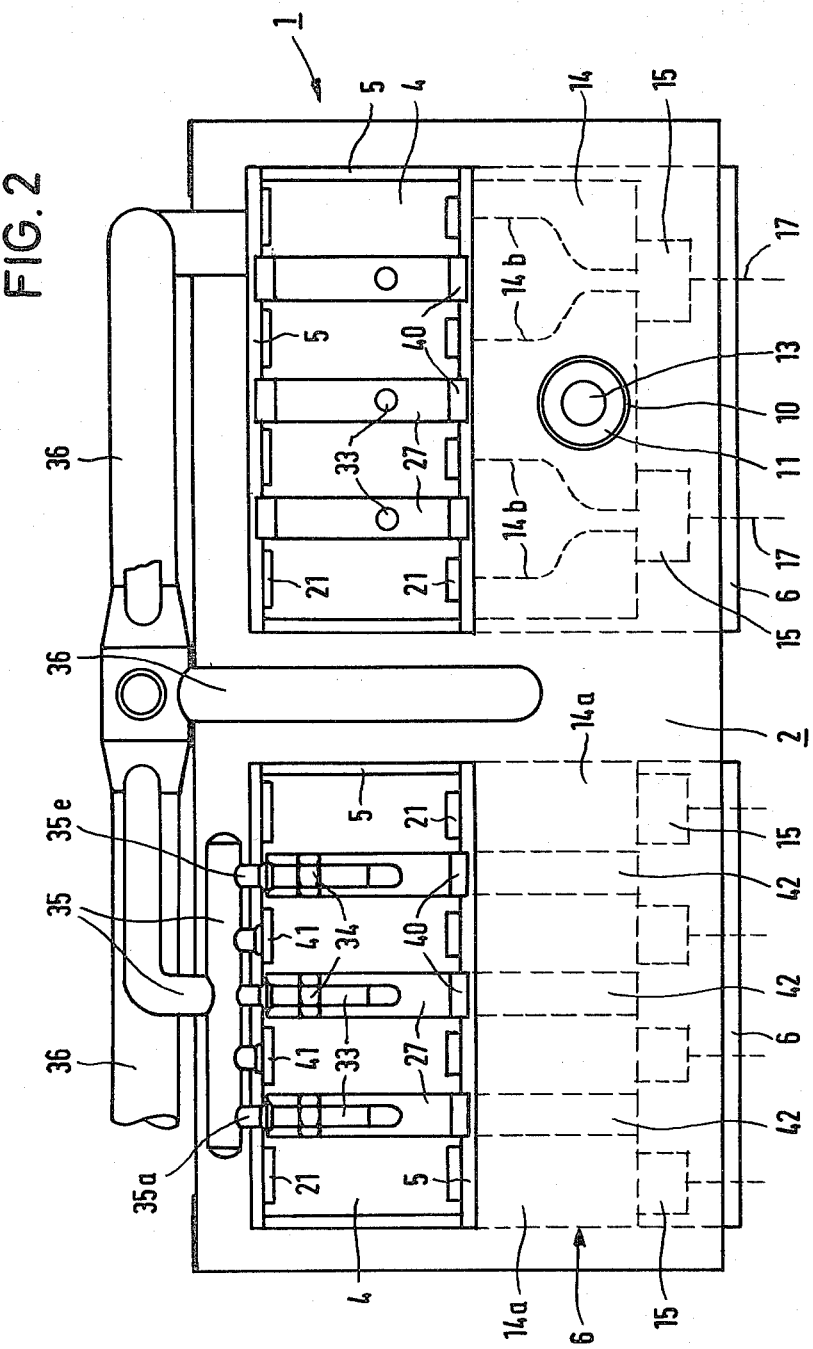
FIG. 2 is a plan view of a spinning manifold with two nozzle shafts.

Referring to FIG. 2, it can be seen that the spinning manifold is symmetrically arranged. The spinning manifold 1 is equipped with two nozzle shafts 4 that are rectangular in cross-section. Each nozzle shaft has arranged within it three heatable members 27 that form four parallelipipedic chambers into which four nozzle blocks 20 may be fitted. Thus each parallelipipedic chamber is heated from all four of its vertical sides, either by the heatable members 27 or the heated nozzle shaft wall 5.

The connecting pipes 35 for the heatable members 27 and the chambers 29 comprise a horizonal distributor pipe, from which extends five short pipe connections 35a through 35e. The first, third, and fifth pipe connections 35a, 35c and 35e are connected by way of quick release threaded pipe couplings 34 and steam pipes 33 to the heatable members 27. The intermediate pipe connections 35b and 35d are provided with blank flanges 41 such that a modified arrangement of the nozzle blocks within the nozzle shaft is possible.

The right and left halves of the spinning manifold are shown with differently designed pumping blocks or units 14 and 14a, respectively. The right side 14 corresponds to the pumping unit shown in FIG. 1. In this arrangement, a pumping unit 14 extends throughout the length of the nozzle shaft 4 and is provided with a plurality of product passages 14b that are connected to the spinning pumps 15. The ends of the product passages 14b that open into the spaces between the heatable members 27 can be connected to the nozzle blocks 20 by threaded feed rods.

In the left side 14a, each space between the heatable members 27 is associated with its own pumping unit 14a and its own spinning pump 15. Fitted into the spaces between the separate pumping units are additional heating chambers 42 similar in structure to the chambers 29. Thus additional heatable members may be placed in chambers 42. This is a particularly advantageous configuration because it insures that the pumping units 14a are each separately in heat exchange with heatable chambers of the proper temperature.

FIGS. 3 through 6 show the same nozzle shaft 4 with different serial arrangements of nozzle blocks. The surfaces of the nozzle boards or capillaries for the spinning of filaments are shown in cross hatch. In FIG. 3, a heatable member 27 is situated in the middle of the nozzle shaft 4 and elongated nozzle blocks 20 are placed on each side of the heatable member. In FIG. 4, four nozzle blocks 20a, which are substantially square in plan view, are placed into the four intermediate spaces formed by three heatable members.

FIG. 5, shows a nozzle shaft 4 that has been subdivided into three compartments for nozzle blocks 20b by two heatable members 27. The nozzle shaft 4 can be further subdivided as shown by FIG. 6. In this latter Figure, seven heatable members 27 have been fitted into the nozzle shaft and eight correspondingly narrow nozzle blocks 20c are enclosed between them.

It is apparent from FIGS. 3 through 6 that the present invention is independent of the frequency of the subdivision of the nozzle shaft 4 by heatable members 27. The feature common to all of these arrangements is that the nozzle blocks 20, 20a, 20b, and 20c are heated on all four of their vertical walls.

It is to be understood that the above described embodiments of the invention are merely illustrative of applications of the principles of this invention and that numerous other arrangements and modifications may be made within the spirit and scope of this invention.

I hereby claim as my invention:

1. A spinning manifold for melt-spinning synthetic high molecular weight polymers comprising, an elongated hollow member for the conduction of a heating medium and at least one vertical nozzle shaft having heatable walls, said nozzle shaft having a plurality of serially arranged separately dismountable nozzle blocks and at least one separately dismountable heatable member, said at least one heatable member extending the width of said nozzle shaft, said at least one heatable member and said nozzle blocks being arranged in an alternating configuration with respect to each other such that at least one of said at least one heatable member is located between and in heat exchange with each juxtaposed pair of said nozzle blocks.

2. A spinning manifold according to claim 1, wherein said heatable member extends at least to the bottom end of said nozzle blocks.

3. A spinning manifold according to claim 1, wherein said heatable member comprises a substantially parallelipipedic chamber.

4. A spinning manifold according to claim 1 wherein said nozzle shaft is connected laterally to a pump shaft, said pump shaft extending substantially throughout the length of the nozzle shaft and accommodating a plurality of pumping units and spinning pumps, said pump shaft having additional heatable members for the conduction of said heating medium, said additional heatable members being located between juxtaposed pumping units such that said additional heatable members are in heat exchange with adjacent pumping units.

5. A spinning manifold according to claim 4, wherein said parallelipipedic chamber has a plurality of lugs at its upper ends to support said parallelipipedic chamber on said nozzle shaft.

6. A spinning manifold according to claim 4, wherein said parallelipipedic chamber is connected to a heating medium duct by a quick release threaded pipe coupling.

7. A spinning manifold according to claim 1, wherein said nozzle shaft is partially covered in the downward direction by a protective plate.

* * * * *